(12) United States Patent
Arakawa

(10) Patent No.: US 8,363,946 B2
(45) Date of Patent: Jan. 29, 2013

(54) DECODING TWO-DIMENSIONAL CODE USING MULTIPLE BINARIZATION THRESHOLDS

(75) Inventor: Junya Arakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 385 days.

(21) Appl. No.: 12/692,708

(22) Filed: Jan. 25, 2010

(65) Prior Publication Data

US 2010/0202695 A1 Aug. 12, 2010

(30) Foreign Application Priority Data

Feb. 10, 2009 (JP) ................................. 2009-028585
Dec. 11, 2009 (JP) ................................. 2009-281957

(51) Int. Cl.
*G06K 9/00* (2006.01)
*G06K 9/46* (2006.01)
*G06K 9/40* (2006.01)
(52) U.S. Cl. ......................... 382/181; 382/275; 382/233
(58) Field of Classification Search .................. None
See application file for complete search history.

(56) References Cited

U.S. PATENT DOCUMENTS

| 6,863,218 B2* | 3/2005 | Muramatsu .............. 235/462.25 |
| 7,264,174 B2* | 9/2007 | Chang et al. .................. 235/494 |
| 7,293,712 B2* | 11/2007 | Wang ........................ 235/462.01 |
| 8,061,615 B2* | 11/2011 | Yada ........................ 235/462.08 |
| 2008/0130884 A1 | 6/2008 | Matsumoto et al. .......... 380/200 |
| 2010/0020970 A1* | 1/2010 | Liu et al. ....................... 380/255 |

FOREIGN PATENT DOCUMENTS

CN 1423236 A 6/2003

OTHER PUBLICATIONS

NPL-2011, Wakahara et al., Image Processing of 2-Dimensional Barcode.*
Chinese Office Action dated Jul. 27, 2011 in Chinese Application No. 201010112391.8.

* cited by examiner

*Primary Examiner* — Chan S Park
*Assistant Examiner* — Ha Le
(74) *Attorney, Agent, or Firm* — Fitzpatrick, Cella, Harper & Scinto

(57) ABSTRACT

The subject of the present invention is to provide an apparatus which can improve decoding performance in the decoding processing of an encoded image pattern to reduce a load of the decoding processing. For solving the above problem, an apparatus according to the present invention is an apparatus for decoding an encoded image pattern having a detection pattern, the apparatus comprising a detecting unit configured to detect the detection pattern from an image, a correcting unit configured to correct a density of the encoded image pattern of which a position is specified by the detected detection pattern, based upon a density of the detected detection pattern, and a decoding unit configured to decode the encoded image pattern of which a density has been corrected.

5 Claims, 17 Drawing Sheets

DECODING TWO-DIMENSIONAL CODE USING MULTIPLE BINARIZATION THRESHOLDS

BACKGROUND OF THE INVENTION

1. Field of the Invention

The present invention relates to an apparatus, a method and a program.

2. Description of the Related Art

There has been emerged MFP which, in copying a printed matter on which an encoded image pattern is printed, produces a copy of an image on the printed matter and also decodes the encoded image pattern in the image on the printed matter. It should be noted that "encoded image pattern" is, for example, a watermark image, a two-dimensional bar code image (called also a two-dimensional code), a bar code image or steganography.

However, an image suitable for producing a copy is different from an image for decoding an encoded image pattern. The image suitable for producing a copy is an image accurately expressing the original image on the printed matter, and the image suitable for decoding the encoded image pattern is an image in which a black portion thereof is clearly distinguished from a white portion thereof.

An object of the preset invention is using an image suitable for producing a copy to decode an encoded image pattern in the image by a high-speed (a small calculation quantity) method.

SUMMARY OF THE INVENTION

For solving the above problem, an apparatus according to the present invention is an apparatus for decoding an encoded image pattern having a detection pattern, the apparatus comprising a detecting unit configured to detect the detection pattern from the image, a correcting unit configured to correct a density of the encoded image pattern of which a position is specified by the detected detection pattern, based upon a density of the detected detection pattern, and a decoding unit configured to decode the encoded image pattern of which a density has been corrected.

According to the present invention, decoding performance in the decoding processing of the encoded image pattern is improved, making it possible to reduce a load of the decoding processing.

Further features of the present invention will be become apparent from the following description of exemplary embodiments (with reference to the attached drawings).

DESCRIPTION OF THE EMBODIMENTS

Hereinafter, embodiments in the present invention will be explained with reference to the accompanying drawings.

First Embodiment

A first embodiment will be explained with reference to the drawings.

<Printing System (FIG. 1)>

Figure 1:
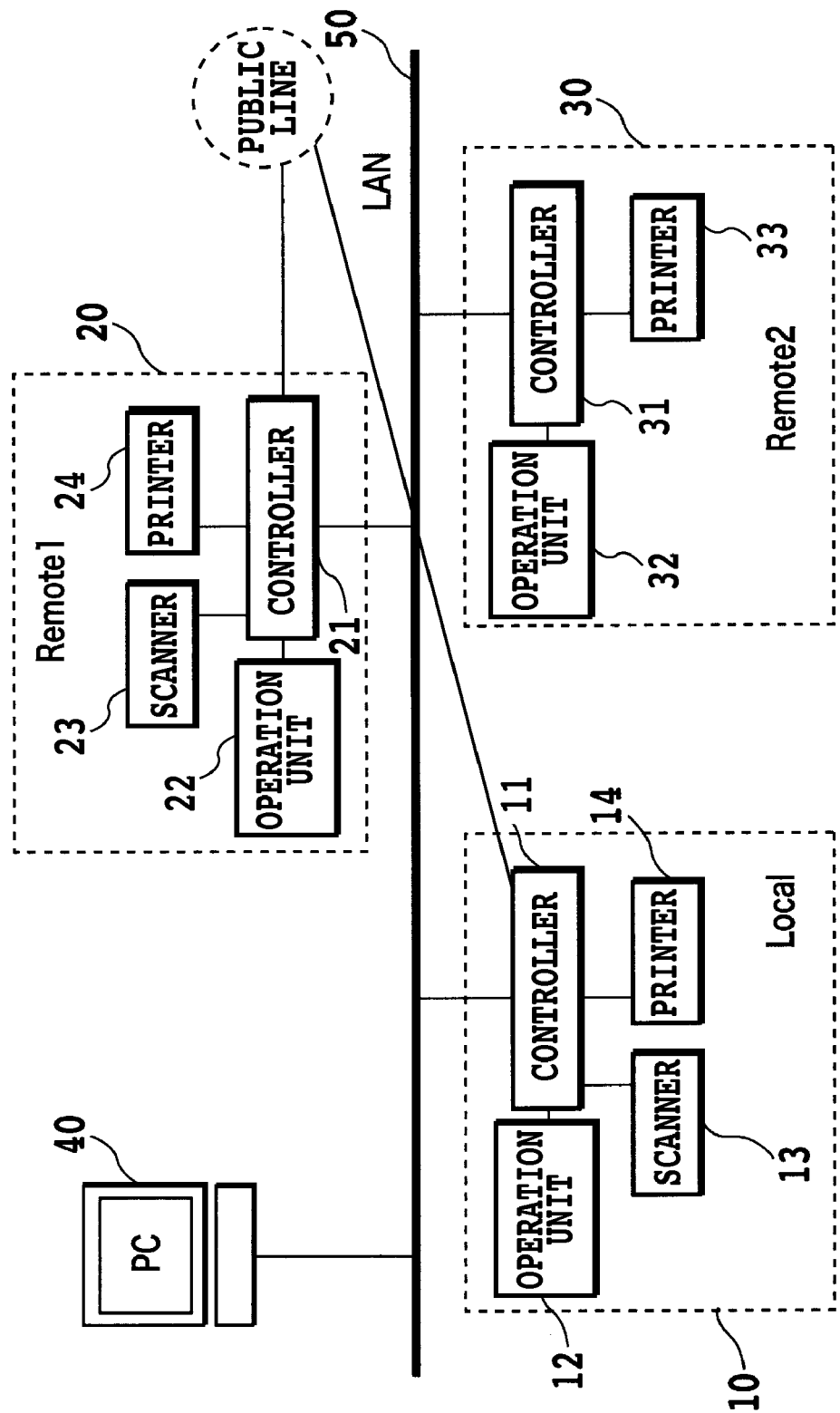
FIG. 1 is a diagram showing an image forming system.

FIG. 1 is a block diagram showing a printing system according to an embodiment in the present invention. In this printing system, a host computer (hereinafter, refer to PC) 40 and three image forming apparatuses (10, 20 and 30) are connected to a LAN 50, but the printing system in the present invention is not limited to the connection numbers. In addition, in the present embodiment, LAN is applied as the connection method, but the connection methods such as an arbitrary network of WAN (public line) or the like, a serial transmission system of USE or the like, and a parallel transmission system such as centronics or SCSI can be applied.

The PC 40 includes a function of a personal computer. The PC 40 can receive/send files using FTP or SMB protocol through the LAN 50 or WAN, or receive/send E-mail. Further, the PC 40 can issue a print command through a printer driver to the image forming apparatuses 10, 20 and 30.

The image forming apparatuses 10 and 20 are similar apparatuses. The image forming apparatus 30 includes only a printing function and is not provided with a scanner equipped in the image forming apparatuses 10 and 20. Hereinafter, a focus on the image forming apparatus 10 among the image forming apparatuses 10 and 20 will be given for detailed explanation thereof.

The image forming apparatus 10 includes a scanner 13 as an image input device, a printer 14 as an image output device, a controller 11 managing an operation control of the entire image forming apparatus 10, and an operation unit 12 as a user interface (UI).

Likewise, the image forming apparatus 20 includes a scanner 23 as an image input device, a printer 24 as an image output device, a controller 21 managing an operation control of the entire image forming apparatus 20, and an operation unit 22 as a user interface (UI).

Likewise, the image forming apparatus 30 includes a printer 33 as an image output device, a controller 31 managing an operation control of the entire image forming apparatus 30, and an operation unit 32 as a user interface (UI).

<Image Forming Apparatus 10>

The scanner 13 in the image forming apparatus 10 includes a plurality of CCDs. When sensitivity of each CCD differs from each other, even if density of each pixel on a manuscript is the same, each pixel is recognized as having a different density with each other. Therefore, the scanner 13 first scans exposure on a white board (uniformly white board) and converts a quantity of reflection light obtained by the scanning exposure into an electrical signal, which is outputted to the controller 11. It should be noted that, as described later, a shading correction unit 500 in the controller 11 recognizes a difference in sensitivity between the respective CODS based upon the electrical signal obtained from each CCD. In addition, the shading correction unit 500 uses the recognized difference in sensitivity to correct a value of the electrical signal obtained by scanning the image on the manuscript.

Further, when the shading correction unit 500 receives information of gain adjustment from a CPU 301 of the controller 11 to be described later, the shading correction unit 500 performs the gain adjustment corresponding to the information. The gain adjustment is used for adjusting how the value of the electrical signal obtained by scanning exposure on the manuscript is allotted to brightness signal values of 0 to 255. With this gain adjustment, the value of the electrical signal obtained by scanning exposure on the manuscript can be converted into a high-brightness signal value or a low-brightness signal value. That is, with this gain adjustment, adjustment of a dynamic range of a reading signal is possible.

Followed by it, the scanner for scanning the image on this manuscript will be explained.

The scanner inputs the reflection light obtained by scanning exposure on the image on the manuscript to the CDD to convert the information of the image into an electrical signal. Further, the electrical signal is converted into a brightness signal composed of each color of R, G and B, and the brightness signal is outputted as an image to the controller 11. At this time, resolution for scanning the manuscript may be designated by the controller 11.

It should be noted that manuscripts are set to a tray of a manuscript feeder (not shown). When a user instructs a reading start from the operation unit 12, the manuscript-reading instruction is given from the controller 11 to the scanner 13. When the scanner 13 receives this instruction, the scanner 13 feeds the manuscripts one by one from the tray of the manuscript feeder to perform a reading operation of the manuscript. It should be noted that a method of reading the manuscript is not limited to an automatic feeding system by a manuscript feeder, but may be a method of placing a manuscript on a glass surface (not shown) and moving the exposure unit thereon to perform a scan of the manuscript.

In addition, the information of frequency characteristics and characteristic parameters of the scanner 13 is saved in a RAM 302 of the controller 11. Here, the characteristic parameters include a white level standard and a corresponding relation between brightness and density.

The printer 14 is an image forming device for forming the image received from the controller 11 on a paper. It should be noted that in the present embodiment, the image forming system is an electrographic photo system using a photoreceptor drum or a photoreceptor belt, but the present invention is not limited to this. For example, the present invention can be applied to an inkjet system which ejects ink from a fine-nozzle array to print on a paper. The printer 14 is provided with a plurality of paper cassettes (not shown) in which a different paper size or a different paper direction is selectable. Papers on which printing has been made are outputted to an output tray (not shown).

<Detailed Explanation of Controller 11 (FIG. 2)>

Figure 2:
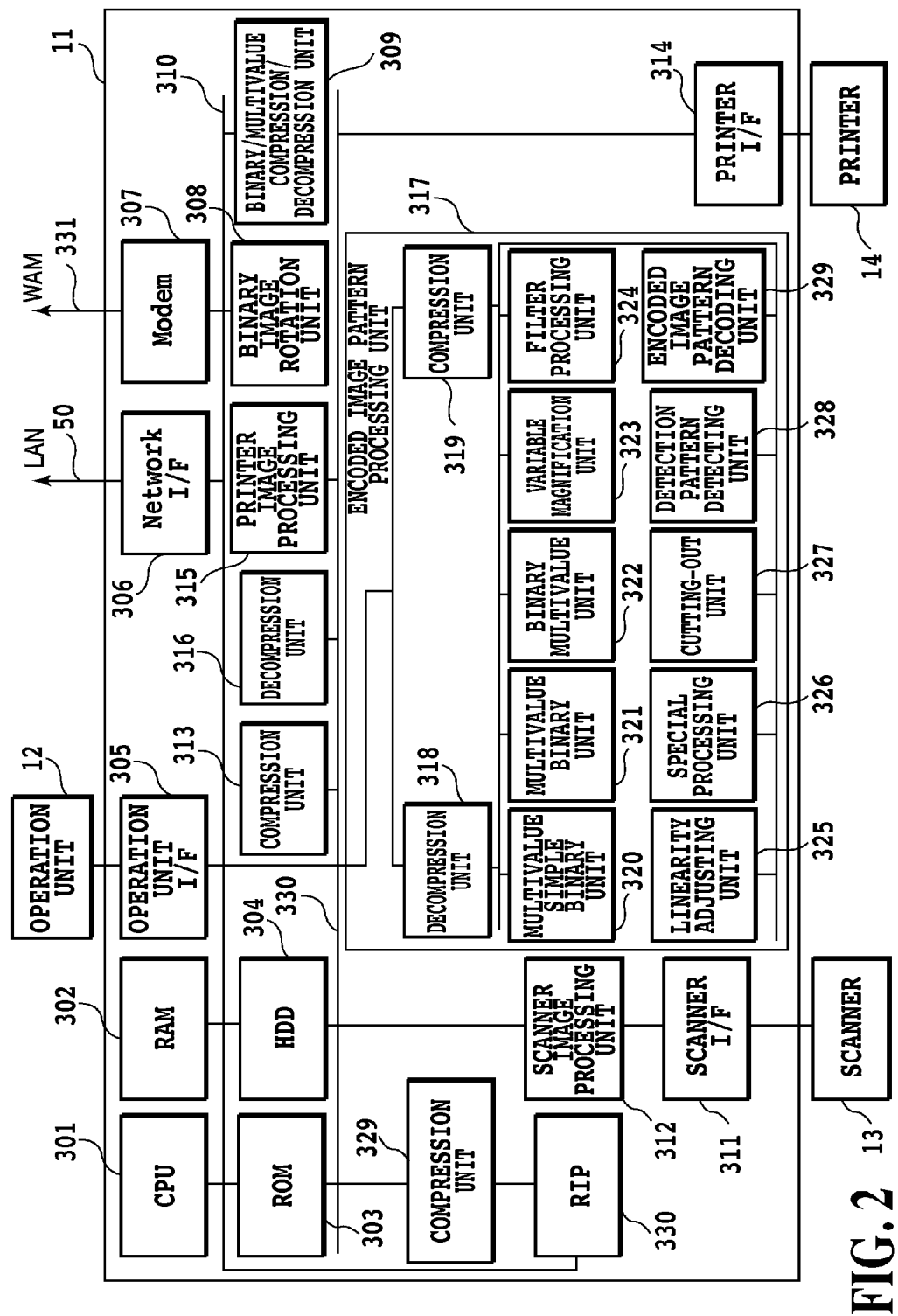
FIG. 2 is a diagram showing an image forming apparatus.

FIG. 2 is a block diagram in more detail explaining the controller 11 in the image forming apparatus 10.

The controller 11 is connected electrically to the scanner 13 and the printer 14, and on the other hand, connected through the LAN 50 and the WAN 331 to the PC 40, an external apparatus and the like. Therefore, input/output of images and device information is possible.

The CPU 301 collectively controls access to various devices which are in the middle of connecting thereto based upon control programs or the like stored in a ROM 303 and also collectively controls various types of processing performed in the controller 11.

A RAM 302 is a system work memory for operating the CPU 301, and also a memory for temporarily storing images. The RAM 302 includes an involatile RAM for saving the stored content after power turns off and a DRAM in which the stored content is deleted after power turns off. Boot programs of the apparatus or the like are stored in the ROM 303.

A HDD 304 is a hard disc drive and stores system software and images therein.

An operation unit I/F 305 is an interface for connecting a system bus 310 and an operation unit 12. The operation unit I/F 305 receives an image to be displayed in the operation unit 12 from the system bus 310 and outputs it to the operation unit 12, and further, outputs the information input from the operation unit 12 to the system bus 310.

A network I/F 306 is connected to the LAN 50 and the system bus 310 to input/output the information.

A modem 307 is connected to the WAN 331 and the system bus 310 to input/output the information.

A binary image rotation unit 308 converts a direction of an image before transmitting.

A binary/multivalue compression/decompression unit 309 converts resolution of the image before transmitting into predetermined resolution or resolution to an opponent's capability. It should be noted that, for the compression and the decompression, a method such as JIG, MMR, MR, or MH is used.

An image bus 330 is a transmission path for receiving/transmitting images and includes a PCI bus or an IEEE1394.

A scanner image processing unit 312 performs correcting, processing, and editing to an image received from the scanner 13 through a scanner I/F 311. It should be noted that the scanner image processing unit 312 determines whether the received image is a colored manuscript or a monochrome manuscript, or a character manuscript or a photo manuscript. Then, the determination result is attached to the image. Such attached information is called attribute data. A detail of the processing executed at the scanner image processing unit 312 will be described later.

A compression unit 313 receives an image and divides this image into blocks each having pixels of 32×32. The image having pixels of 32×32 is called tile data.

Figure 3:
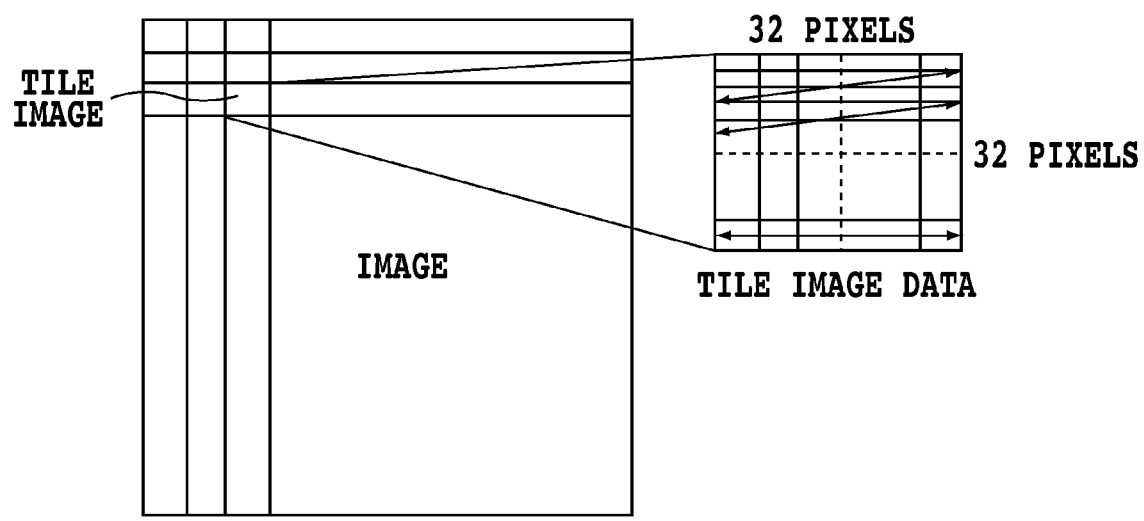
FIG. 3 is a diagram showing tile data conceptually.

FIG. 3 shows the tile data conceptually. In a manuscript (paper medium before read), an area corresponding to the tile data is called a tile image. It should be noted that average brightness information in the block having pixels of 32×32 and coordinate positions of the tile image on the manuscript are added as header information to the tile data. Further, the compression unit 313 compresses the image formed of plural tile data. A decompression unit 316 decompresses the image formed of the plural tile data, and thereafter, performs raster development thereto, and transmits the rasterized data to a printer image processing unit 315.

The printer image processing unit 315 receives the image transmitted from the decompression unit 316 and executes the image processing to the image by referring to the attribute data attached to the image. The image after the image processing is outputted through the printer I/F 314 to the printer 14. On this occasion, the image is once compresses at the compression unit 313 and the compressed image is decompressed at the decompression unit 316. Then the image after the image processing may be outputted through the printer I/F 314 to the printer 14. A detail of the processing to be executed at the printer image processing unit 315 will be described later.

An encoded image pattern processing unit 317 executes various types of processing to the image to execute the processing of decoding (decoding processing) for the encoded image pattern existing in the image. The image to be processed by the encoded image pattern processing unit 317 is an image which is processed at the scan image processing unit 312 or at the printer image processing unit 315 and thereafter, is compressed at the compression unit 313. The above processing units are not needed to be hardware and may be programs developed on the RAM 302. A detail of the processing to be executed at the encoded image pattern processing unit 317 will be described later.

A RIP 330 receives intermediate data generated based upon PDL code data transmitted from the PC 40 or the like to generate bit map data (multivalue).

<Detailed Explanation of Scanner Image Processing Unit 312 (FIG. 4)>

Figure 4:
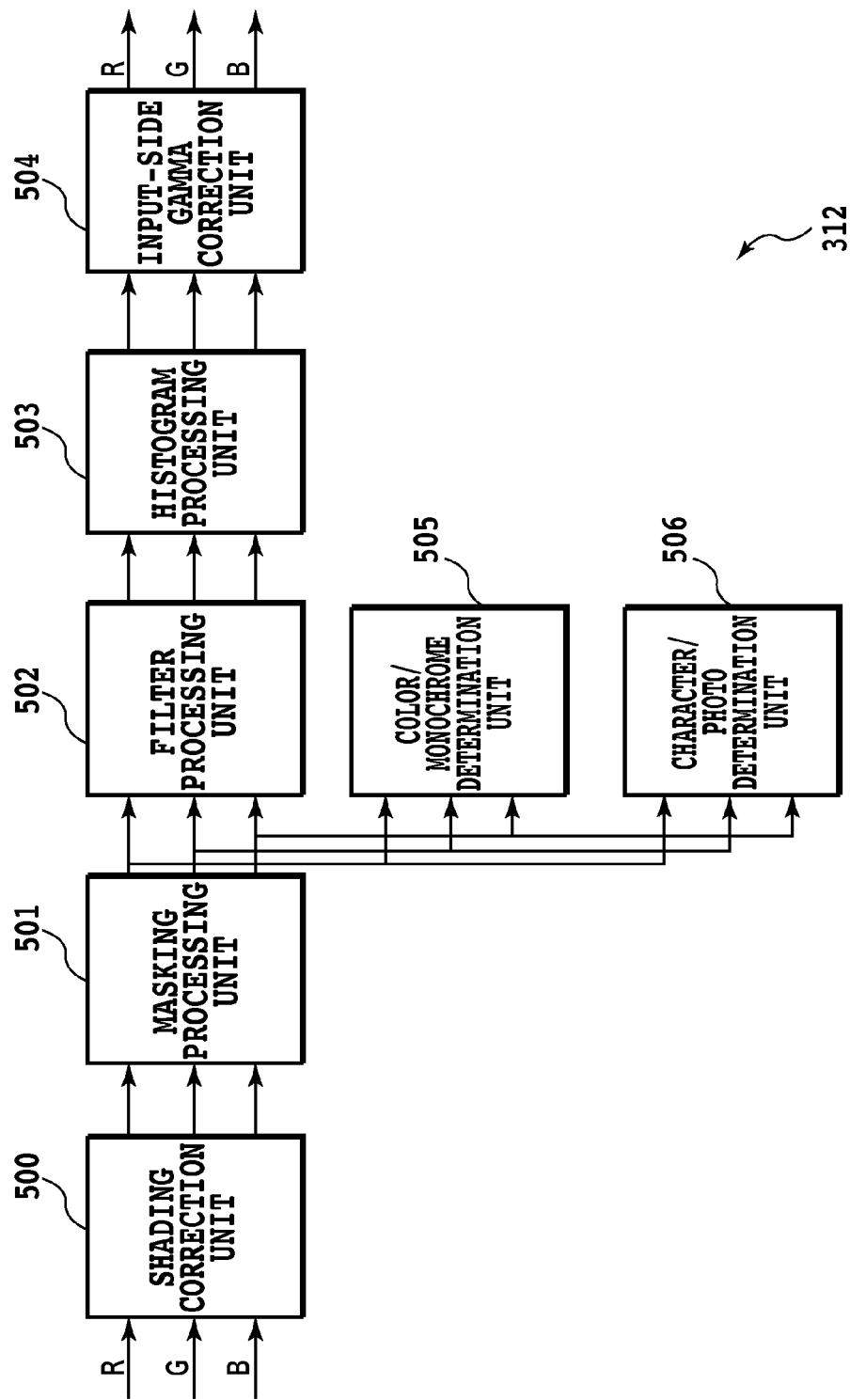
FIG. 4 is a block diagram of a scanner image processing unit.

FIG. 4 shows the scanner image processing unit 312.

The scanner image processing unit 312 receives an image composed of brightness signals of RGB each having eight bits.

The shading correction unit 500 makes shading correction to the brightness signal. The shading correction is the processing for preventing brightness of the manuscript from being recognized in error due to variations in sensitivity of the CCD as described above. Further, as described above, the shading correction unit 500 can perform the gain adjustment by an instruction from the CPU 301.

Followed by it, the brightness signal is converted into a standard brightness signal which does not depend on a filter color of the CCD by a masking processing unit 501. The conversion into the standard brightness signal is executed using a three-dimensional lookup table after adjustment of each color of RGB is once made by a one-dimensional lookup table.

A filter processing unit 502 arbitrarily corrects a space frequency of the received image. The filter processing unit 502 executes calculation processing using, for example, a matrix of 7×7 to the received image.

Figure 6:
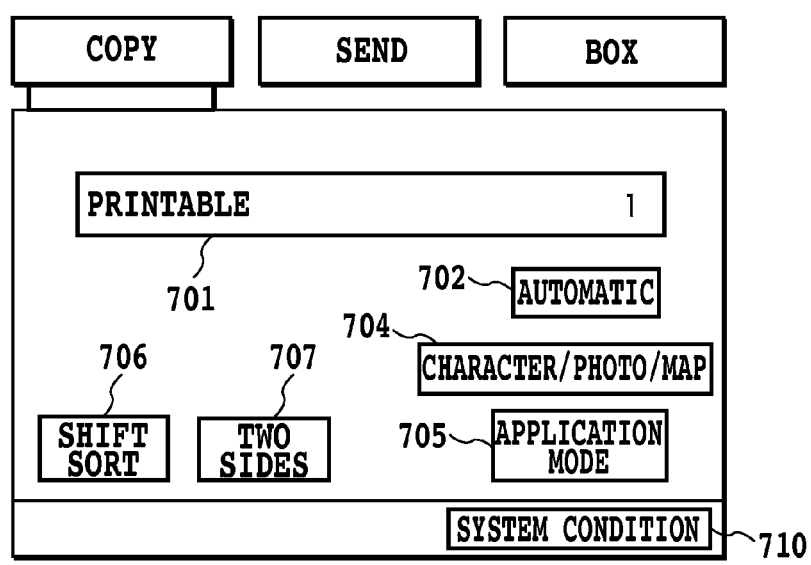
FIG. 6 is a diagram explaining a copy screen of an operation unit.

Incidentally in a copier or a complex machine, by pressing down a tab 704 in FIG. 6, a character mode, a photo mode or a character and photo mode can be selected as a copy mode. Here, in a case where the character mode is selected by a user, the filter processing unit 502 applies a character filter over an entire image. In a case where the photo mode is selected, the filter processing unit 502 applies a photo filter over an entire image. In a case where the character and photo mode is selected, the filter processing unit 502 adaptively switches the filter for each pixel in response to a character and photo determining signal (a part of attribute data) to be described later.

That is, a determination on whether the photo filter or the character filter is applied for each pixel is made. It should be noted that a coefficient is set to the photo filter in such a manner that a high frequency component only is smoothed. This is because of preventing unevenness of the image from being distinct. Further, a coefficient is set to the character filter in such a manner as to place a strong edge emphasis. This is made for producing sharpness of the character. It should be noted that the filter parameters used at the filter processing unit 502 are saved in the RAM 302 since the parameters are possibly used at the post processing.

The histogram generating unit 503 samples brightness data of each pixel in the received image. In more detail, the brightness data in a rectangular area surrounded by a starting point to a terminal point indicated in a main scan direction and a sub scan direction respectively are sampled by a constant pitch in the main scan direction and the sub scan direction. Then, histogram data are generated based upon the sampling result. The generated histogram data are used for estimating a groundwork level at the time of executing groundwork elimination processing. It should be noted that the result of the sampling at the histogram generating unit 503 is saved in the RAM 302 for the possibility of being used in the groundwork elimination processing or in the other later processing.

An input-side gamma correction unit 504 converts the histogram data into brightness data having non-linear characteristics by using the one-dimensional lookup table input to the input-side gamma correction unit 504. It should be noted that the one-dimensional lookup table parameters used at the input-side gamma correction unit 504 are saved in the RAM 302 since they are possibly used in the latter processing.

A color/monochrome determination unit 505 determines whether each pixel of the image received at the color/monochrome determination unit 505 has a chromatic color or an achromatic color and attaches the determination result to the image as a color/monochrome determining signal (a part of the attribute data).

A character/photo determination unit 506 determines whether each pixel of the image is a pixel of a character, a pixel of a dot, a pixel of a character in the dot or a pixel of a beta image based upon a pixel value of each pixel and a pixel value of a peripheral pixel of each pixel. It should be noted that the pixel which does not correspond to any pixel is a pixel in a white area. The determination result is attached to the image as the character/photo determining signal (a part of the attribute data).

<Detailed Explanation of Printer Image Processing Unit 315 (FIG. 5)>

Figure 5:
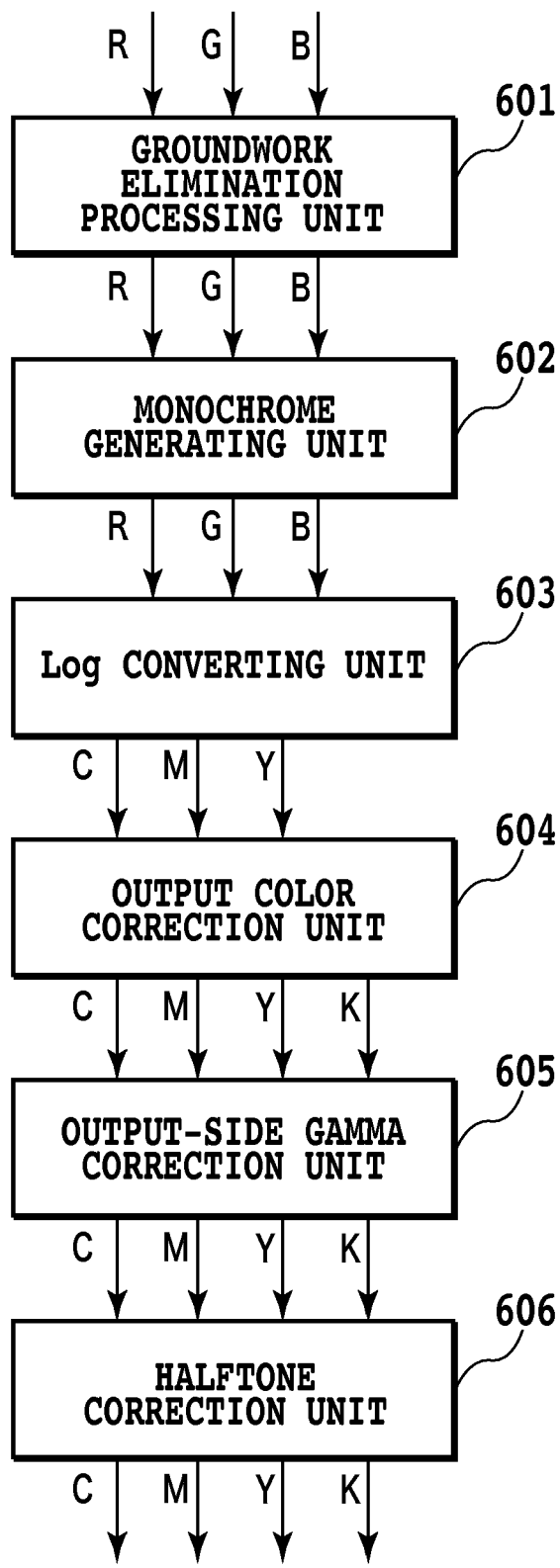
FIG. 5 is a block diagram of a printer image processing unit.

FIG. 5 shows the procedure of the processing executed at the printer image processing unit 315.

A groundwork elimination processing unit 601 eliminates (removes) the groundwork color of an image by using the histogram generated at the scanner image processing unit 312.

In a case of making a monochrome print, a monochrome generating unit 602 converts color data into monochrome data.

A Log converting unit 603 performs brightness density conversion. The Log converting unit 603 converts, for example, an input image of ROB into an image of CMY.

An output color correction unit 604 makes an output color correction. For example, an input image of CMY is converted into an image of CMYK by using a table or a matrix.

An output-side gamma correction unit 605 corrects a signal value input to the output-side gamma correction unit 605 and a reflection density value after outputting a copy so as to be in proportion to each other.

An halftone correction unit 606 executes halftone processing to a gradation number of a printer to be printed. For example, the halftone correction unit 606 performs binarization or 32-value processing to the received image of high gradation.

It should be noted that the respective processing units in the scanner image processing unit 312 and the printer image processing unit 315 can also output the received images without executing the respective processing thereto.

<Detailed Explanation of Encoded Image Pattern Processing Unit 317 (FIG. 2)>

A detail of the encoded image processing unit 317 described in FIG. 2 will be explained.

The decompression unit 318 decompresses an image which the decompression unit 318 has received. The image decompressed by the decompression unit 318 can be processed using processing units 320 to 329 in any order. The compression unit 319 compresses an image which the compression unit 319 has received. The image to be received by the compression unit 319 may be binary data or multivalue data.

A multivalue simple binary unit 320 performs simple binarization to the multivalue image which the multivalue simple binary unit 320 has received. The simple binarization is to binarize an image with a threshold value set by the CPU 301. A color image is converted into a gray scale image by any conversion formula and thereafter, is binarized with the threshold value set by the CPU 301.

A multivalue binary unit 321 binarizes the multivalue image which the multivalue binary unit 321 has received. The multivalue binary unit 321 can binarize the multivalue image with various kinds of methods other than the simple binarization. Specially the multivalue binary unit 321 can determine a threshold value so as to maximize separability of two clusters by using a histogram or can determine a threshold value in such a manner that a duty ratio between white pixels and black pixels becomes 50% by using a histogram. The color image is converted into a gray scale image by any conversion formula, which is thereafter binarized.

A binary multivalue unit 322 converts the binarized image into a multivalue image. Specially the binary multivalue unit 322 converts the binary image into an image having a minimum value and a maximum value of the multivalue and thereafter, performs binary multivalue conversion by obscuring the converted image with a filter such as a gaussian filter.

A variable magnification unit 323 executes variable magnification processing to an image. Specially the variable magnification processing unit 323 performs linear variable magnification, cubic variable magnification or thinning-out variable magnification to execute the variable magnification processing.

A filter processing unit 324 executes filter processing to an image. The filter processing can be executed by using a filter of any configuration and any coefficient set by the CPU 301.

A linearity adjusting unit 325 can adjust linearity of an image using a one-dimensional LUT (Look Up table).

A special processing unit 326 can execute specific processing such as removal of noise dots, fatting processing and thinning processing.

A cutting out unit 327 can cut out apart of an image in any size.

Figure 10:
FIG. 10 is a detection pattern diagram of a two-dimensional code.

A two-dimensional code as the encoded image pattern used in the present embodiment will be explained before explaining a detection pattern detecting unit 328 and an encoded image pattern decoding unit 329. For example, a QR code (registered trademark) may be used as the two-dimensional code. It should be noted that the present invention can be applied to all the encoded image patterns in which a detection pattern exists even if it is not the two-dimensional code. The detection pattern is a pattern for detecting an encoded image pattern, and a featuring pattern which tends to be easily detected. The detection pattern of the two-dimensional code is a pattern as shown in FIG. 10. The encoded image pattern area other than the detection pattern is called an encoded image pattern body. In addition, a white area as a minimum unit of the encoded image pattern is called a white cell and a black area thereof is called a black cell.

The two-dimensional code is an encoded image pattern defined by JIS X0510. An event that the two-dimensional code is added to a manuscript side is defined as a precondition in the present invention. A flow chart of the encoding will be explained.

Figure 8:
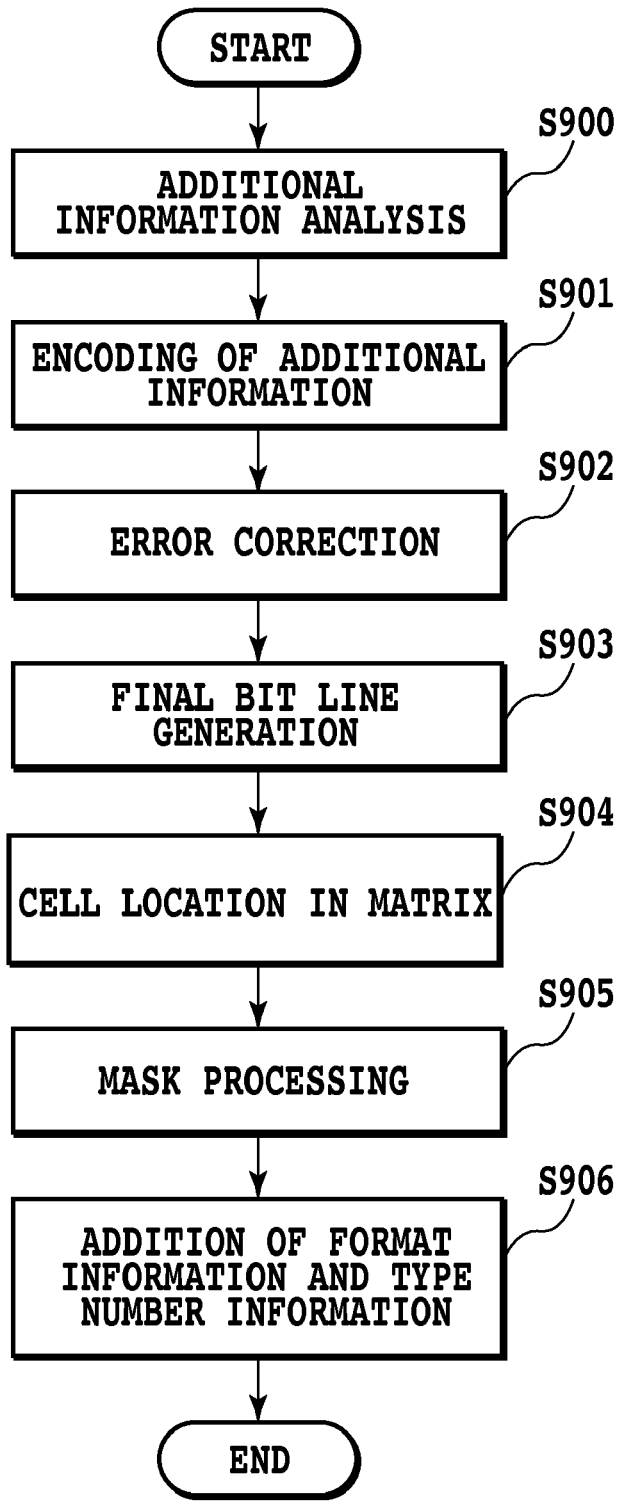
FIG. 8 is a flow chart showing encoding of a two-dimensional code.

FIG. 8 is a flow chart showing the process of generating a two-dimensional code by using additional information of copy restricting information or the like. The flow chart in FIG. 8 may be executed by a CPU in an apparatus adding a two-dimensional code to a manuscript or by a CPU in a personal computer connected to the apparatus adding the two-dimensional code to the manuscript.

First, at step S900 the CPU analyses additional information for identifying a different kind of a character to be encoded. In addition, the CPU selects an error correction level and selects the minimum type number of the two-dimensional code which can accommodate the additional information. The type number of the two-dimensional code is the number expressing a size of the two-dimensional code and composed of values of 1 to 40. The type number 1 is a size of 21 cells×21 cells and becomes a magnitude of 177 cells×177 cells.

Next, at step S901 the CPU performs encoding of the additional information. First, the CPU converts the additional information into a predetermined bit line and if necessary, an indicator expressing the kind (numbers, English numbers, 8-bit bite, Chinese characters and the like) of the original data (additional data) of the bit line and a terminal pattern are added. Next, the CPU divides this bit line in an 8-bit unit. The bit line of the 8-bit unit is called a data code word and the bit line divided in the data code word unit is called a data code word line. The number of the data code word is defined in accordance with the type number and the error correction level and if the defined number is not satisfied, the CPU adds meaningless data code words to the data code word line.

Next, at step S902 the CPU, for adding the information for error correction, divides the data code word line obtained at step S901 into the number of a plurality of blocks in accordance with the type number and the error correction level. Then the CPU generates an error correction code word line for revising the error in the block for each block, which is added following the data code word line. It should be noted that the error correction code word is also a bit line of 8-bit unit. The data code word and the error correction word are called a code word and the lineup thereof is called a code word line.

Next, at step S903 the CPU interleaves the code word line of each block obtained at step S902 in a code word unit of 8 bits, and adds remaining bits in accordance with the type number. The interleaving is made for increasing resistance to a burst error by degrading continuity of the code word line. The final lineup of the bits thus formed is called a final bit line.

Next, at step S904 the CPU sets a matrix in which white cells or black cells are located. A size of the matrix is determined for each type number. Construction elements of the encoded image body are located together with the detection pattern in the matrix. The construction elements of the encoded image body include a separation pattern, a timing pattern, a positioning pattern and the like, and the final bit line obtained at step S903. In the location of the final bit line, the CPU associates the white cell with bit 0 and the black cell with bit 1 to locate the black and white cells. The location thereof is made based upon a location rule in accordance with the type number.

Next, at step S905 the CPU selects a most suitable mask pattern in an area where the final bit lines obtained at step S904 are lined up to execute mask processing by exclusive logical addition (XOR) calculation. XOR calculation is the processing in which in a case where the mask pattern is 0 and the corresponding cell is a white cell, the white cell is converted into a black cell and in a case where the mask pattern is 1 and the corresponding cell is a black cell, the black cell is converted into a white cell. Here, the most suitable mask pattern will be explained. An ideal location pattern of white cells and black cells is an area in which a pattern similar to the detection pattern is not contained, the black cells or the white cells are not continuously located and a ratio of the white cells and the black cells is close to 1 to 1. As a result of the mask processing (exclusive logical addition), the mask pattern which can obtain such a pattern is the most suitable mask pattern. It should be noted that as a result of the mask processing, when the pattern similar to the detection pattern is obtained, it leads to an erroneous detection of the detection pattern, and therefore, it is not desirable. In addition, since there is the possibility that in an area where the white cells or the black cells are continuously located, one cell tends to be large and the cell is not sized to be as large as it should be by itself, it is not desirable. In reverse, as a result of the mask processing, when a ratio of the white cells and the black cells is close to 1 to 1 (in addition, the cells are not so much continuously located), even if the black cell is difficult to be formed, or the white cell is difficult to be formed, since the white and black cells are equally formed, it is a preferable pattern.

Next, at step S906 the CPU generates format information and type number information in a module obtained at step S905 to complete an encoded image pattern. The error correction level and the used mask pattern information are included in the format information.

Figure 7:
FIG. 7 is a diagram showing a two-dimensional code.

As a result thus encoded, the two-dimensional code becomes an encoded image pattern having an outer appearance as shown in FIG. 7.

Any information can be encoded to the two-dimensional code. In the present invention, an event that a two-dimensional code pattern in which copy condition information is encoded is provided on a paper manuscript, and the paper manuscript is scanned by the image forming apparatus 10 is the precondition. It should be noted that in addition to the copy condition information, various kinds of attribute information such as an output printer/output time of the manuscript may be encoded.

Next, the detection pattern detecting unit 328 and the encoded image pattern decoding unit 329 will be explained by providing such a two-dimensional code as the pre-condition.

The detection pattern detecting unit 328 detects a detection pattern existing in the encoded image pattern from the image to specify a position of the encoded image pattern. The detection is usually made to the binarized image for high-speeding, but may be made to the multivalue image. For improving the detection efficiency, the detection may be made to an image in which the resolution is lowered by down-sampling the image.

In a case where a location of the body of the encoded image pattern is already known, the encoded image pattern decoding unit 329 executes decoding processing to the encoded image pattern body to take out information data.

Figure 11:
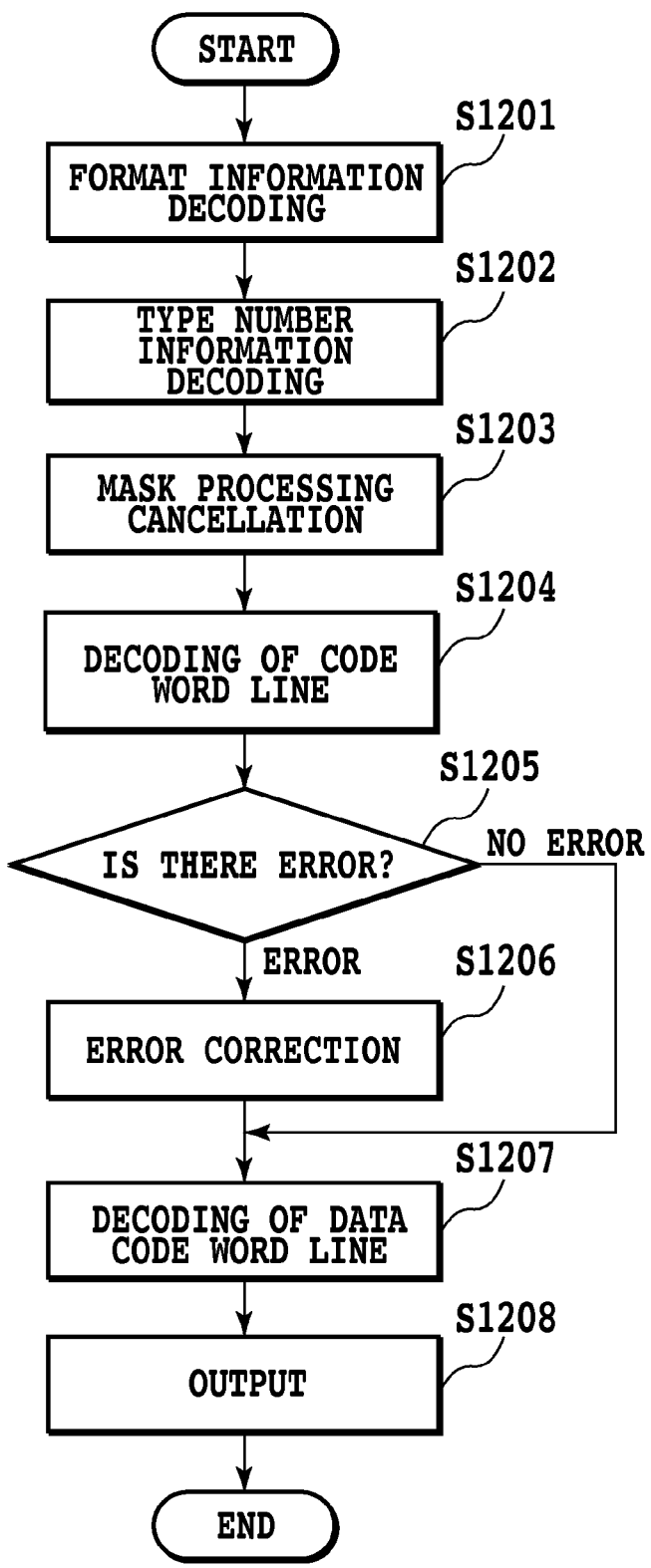
FIG. 11 is a flow chart showing decoding processing of a two-dimensional code.

FIG. 11 is a diagram explaining decoding of the encoded image patter (in a flow chart in FIG. 11, a position of the detection pattern is already specified and a position of the encoded image pattern body is already known).

First, at step S1201 the encoded image pattern decoding unit 329 decodes the format information adjacent to the detection pattern to obtain the error correction level applied to the encoded image pattern and the mask pattern information.

Next, at step S1202 the encoded image pattern decoding unit 329 decodes the type number information adjacent to the detection pattern to determine the type number of the encoded image pattern.

Next, at step S1203 the encoded image pattern decoding unit 329 performs XOR-calculation for a final bit line area by using the mask pattern obtained by decoding the format information, thus lifting the mask.

Next, at step S1204 the encoded image pattern decoding unit 329 reads the bit pattern in the final bit line area in which the mask is lifted, according to the location rule corresponding to the type number. In addition, the encoded image pattern decoding unit 329 cancels the interleave to decode the code word line (data code word line and error correction code word).

Next, at step S1205 the encoded image pattern decoding unit 329 detects an error of the data using the error correction code word line. When the error is not detected, the process goes to step S1207, and when the error is detected, the process goes to step S1206.

Next, at step S1206 the encoded image pattern decoding unit 329 corrects the error of the data code word line.

Next, at step S1207 the encoded image pattern decoding unit 329 decodes the data code word line based upon the indicator showing the kind of the original data (additional information) to obtain the encoded additional information.

Next, at step S1208 the encoded image pattern decoding unit 329 outputs the decoded, encoded information.

Figure 13:
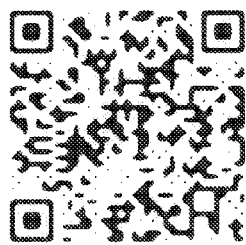
FIG. 13 is a diagram showing a two-dimensional code after pre-processing of detection processing of a detection pattern.

In the processing from step S1201 to step S1204, the processing is executed by converting the black and white pattern including the black cells and the white cells and located in the two-dimensional code into data line of one bit as needed. It is easy to take out the data line of one bit from the encoded image pattern where the shapes of the white and the black patterns as shown in FIG. 7 are clear. However, it is difficult to take out the data line of one bit from the encoded image pattern where the white and the black patterns are disturbed as shown in FIG. 13 and the white or black pattern is fatted or thinned. There are some cases where the processing results in a failure in regard to the encoded image pattern where it is difficult to take out the data line of one bit.

<Explanation of Operation Screen>

FIG. 6 is an initial screen in the image forming apparatus 10.

An area 701 shows whether or not the image forming apparatus 10 is in a state of being capable of copying and shows the set numbers of copies.

A manuscript selection tab 704 is a tab for selecting a type of a manuscript. When this tab is pressed down, three kinds of selection menus composed of a character mode, a photo mode, and a character and photo mode are popup-displayed.

A finishing tab 706 is a tab for performing settings relating to various kinds of finishing.

A two-side setting tab 707 is a tab for performing settings relating to two-side reading and two-side printing.

A color mode tab 702 is a tab for selecting a color mode of a manuscript. When this tab is pressed down, three kinds of selection menus composed of color, black and automatic (ACS) are popup-displayed. It should be noted that when the color is selected, a color copy is made and when black is selected, a monochrome copy is made. When ACS is selected, a copy mode is determined by the aforementioned monochrome color determining signal.

The explanation of the system in the present embodiment is as described above.

Figure 9:
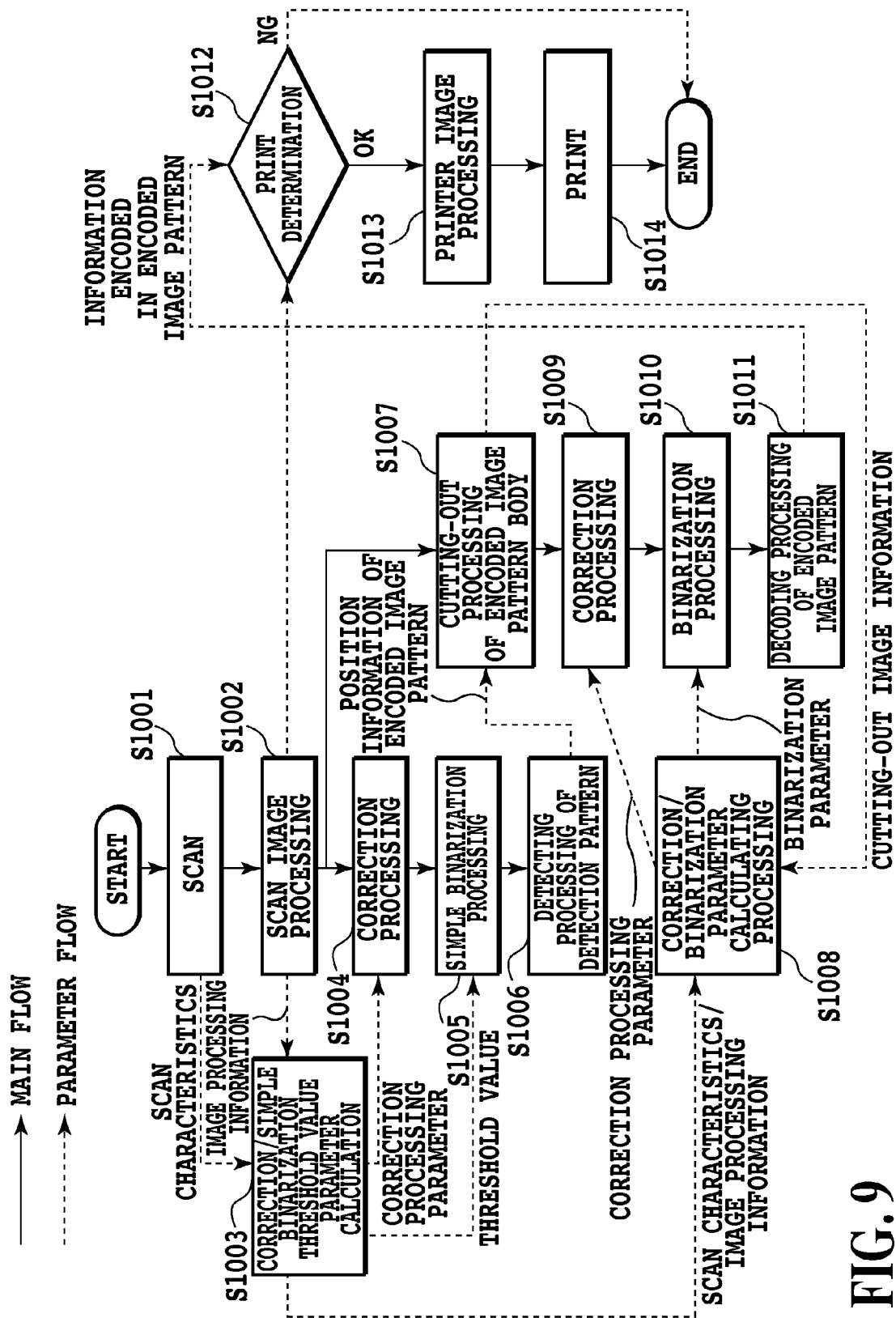
FIG. 9 is a flow chart of a first embodiment.

FIG. 9 shows a flow chart of the present embodiment.

The processing of each process in the present flow chart is collectively controlled by the CPU 301. The flow chart shown in FIG. 9 is executed when a user selects the processing accompanied by scan processing and presses a start button at the operation unit 12.

First, at step S1001 when the CPU 301 detects that the start button of the operation unit 12 is pressed, the CPU 301 activates the scanner 13 to scan a manuscript. The CPU 301 is configured to send the manuscript read by the scanner 13 through the scanner I/F 311 to the scanner image processing unit 312 as an image. In addition, the CPU 301 saves the information of setting parameters such as scan resolution at scanning and characteristic parameters of the scanner at the RAM 302.

Next, at step S1002 the scanner image processing unit 312 executes the scanner image processing to the image.

A scanner image processing unit 312 executes the processing to the shading correction unit 500, the masking processing unit 501, the filter processing unit 502, the histogram processing unit 503, the input-side gamma correction unit 504, the color/monochrome determination unit 505 and the character/photo determination unit 506. The scanner image processing unit 312 generates the attribute data together with the processed image, and attaches the attribute data to the image. The scanner image processing unit 312 sends the image to the compressing unit 313 and saves the compressed image in the RAM 302 or the HDD 304. The CPU 301 saves information in regard to parameters at scan image processing in the RAM 302.

Next, at step S1003 the CPU 301 calculates parameters in correction processing at step S1004 and threshold value parameters in simple binarization processing at step S1005. At the calculating, the CPU 301 uses information of setting parameters at scanning and characteristic parameters of the scanner, and parameters at scan image processing which are saved in the RAM 302.

Next, at step S1004 the CPU 301 executes as main correction processing the variable magnification processing at the variable magnification unit 323, the filter processing at the filter processing unit 324, and the linearity adjusting processing at the linearity adjusting unit 325.

The parameter of the variable magnification processing is determined based upon setting parameters in regard to scan resolution at scanning so as to have resolution suitable for detection of the later encoded image pattern. For example, when the scan resolution has lopsided variable magnification such as 600×300 and it is necessary that the main and sub scans have the same resolution, resolution conversion parameters are determined in such a manner that the main and sub scans have the same resolution, such as 600×600 or 300×300. In the variable magnification method, since the variable magnification processing is executed to the entire scan image surface, it is required to take the calculation costs into account. Therefore, it is prioritized to apply the variable magnification method such as simple elimination or simple enlargement in which the calculation cost is low.

A parameter determination method of the filter processing will be described. First, averaging brightness and frequency characteristics in the encoded image area of the image at this point are estimated based upon the characteristic parameters and the filter parameters at the filter processing unit 502 at scan image processing. Here, the characteristic parameters include, for example, frequency characteristics of the scanner and the white level standard.

Next, parameters are determined based upon this estimation in such a manner that the image has average brightness and frequency characteristics suitable for detection of the later encoded image pattern. The ideal average brightness is a level in which the average brightness in the encoded image area is a value of 50% (if the image has 8 bits, the average brightness is 127 or 128). The ideal frequency characteristic is a characteristic in which there are many frequency components corresponding to the corresponding encoded image pattern and there are a few frequency components of the other encoded image pattern.

The parameter determining method of the linearity adjusting processing will be described. First, based upon the characteristic parameter, the sampling result of the histogram generating unit 503 at scan image processing and the one-dimensional LUT parameter of the input-side gamma correction unit 504, the corresponding relation between brightness and density at that point is estimated. Here, the characteristic parameter is a white level standard of the scanner or the corresponding relation between brightness and density. Next, parameters of the one-dimensional LUT are determined based upon this estimation in such a manner that the image has a corresponding relation between brightness and density suitable for detection of the later encoded image pattern. The relation between brightness and density suitable for detection of the encoded image pattern, which depends on the detection method, is preferably a linear corresponding relation.

The threshold value parameter of the simple binarization processing at step S1005 may be a value of 50% (if the image is 8 bits, it is 127 or 128) if the correction processing is correctly executed. However, for reducing a load of the correction processing, in a case where the correction processing is not sufficiently executed, a deviation from the threshold value of 50% due to non-correction processing is calculated. A value to which the deviation value is reflected is defined as the threshold value (because it is required to take the filter processing into account, an accurate deviation value can not be calculated).

Next, at step S1004 the CPU 301 decompresses the compressed image saved in the RAM 302 or in the HDD304 at the decompression unit 318 for processing it at the encoded image pattern processing unit 317. Next, the CPU 301 executes the correction processing based upon the correction processing parameter determined at step S1003. That is, the CPU 301 determines a correction quantity for executing the correction processing, based upon the correction processing parameter determined at step S1003.

The variable magnification unit 323 executes the variable magnification processing based upon the variable magnification processing parameter determined at step S1003. The filter processing unit 324 executes the filter processing based upon the variable magnification processing parameter determined at step S1003. The linearity adjusting unit 325 executes the linearity adjusting processing based upon the linearity adjusting processing parameter determined at step S1003. The image as a correction processing object may be an entire surface of the scanned image. In addition, for reducing a load of the correction processing, the image as the correction processing object may be a part of the scanned image.

Next, at step S1005 the CPU 301 executes simple binarization processing to the image corrected at step S1004, at the multivalue simple binary unit 320 based upon the threshold value parameter of the simple binarization processing determined at step S1003.

Next, at step S1006 the CPU 301 performs detection for a detection pattern of the encoded image pattern from the image binarized at step S1005 at the detection pattern detecting unit 328. Since plural detection patterns exist per one information code, a position of the encoded image pattern body can be specified from the position relation. In consequence, in a case where the detection pattern is detected, the CPU 301 derives the position information of the encoded image pattern from the detected detection pattern information and saves that position information in the RAM 302.

Next, at step S1007 the CPU 301 decompresses the compressed image saved in the RAM 302 or in the HDD304 at the decompression unit 318 to process it at the encoded image pattern processing unit 317. Next, the CPU 301 cuts out an image used for decoding the encoded image pattern, at the cutting-out unit 327 based upon the position information of the encoded image pattern saved at the RAM 302 determined at step S1006. Specially the image of a rectangle (that is, a rectangle bounded by all the three detection patterns) formed by three detection patterns is cut out. In regard to the binary image used for detection of the detection pattern, the correction processing and the binarization processing are required to be executed to the entire surface of the image, but since a load of the processing is large, the sufficient processing can not be executed. However, the image used for decoding the encoded image pattern is a part of the entire image and at the later step S1009 and step S1010, more complicated image processing can be executed without taking the load of the processing into account. Therefore, for executing unique image processing for decoding the encoded image pattern, the detection image of the detection pattern may be not used for decoding the encoded image pattern.

Next, at step S1008 the CPU 301 calculates parameters of the correction processing used at step S1009 and parameters of the binarization processing used at step S1010. At the time of the calculating, in addition to the information in regard to the parameter at scanning and the parameter at scan image processing saved in the RAM 302 used at step S1003, the information of the cut-out image itself is used. By using the information of the cut-out image itself in addition to the information used at step S1003, more accurate correction processing and binarization processing are realized.

Next, at step S1009 the CPU 301 executes, as main correction processing, the variable magnification processing by the variable magnification unit 323, the filter processing by the filter processing unit 324, the linearity adjusting processing by the linearity adjusting unit 325, and the fatting processing by the special processing unit 326.

A method of determining parameters in the variable magnification processing at step S1009 is the same as the method of determining the parameters at step S1003. However, the variable magnification processing at step S1009 is the variable magnification processing to a partial image. Therefore, the load of the variable magnification processing at step S1009 is lower than the load of the variable magnification processing at step S1004. Accordingly, at step S1009 the variable magnification processing parameter may be determined taking into account that cubic variable magnification where the variable magnification performance is high, but calculation costs are high can be applied.

A parameter determining method of the filter processing will be described. First, the cut-out image as an object is analyzed to obtain average brightness and frequency characteristics of the image. The analysis of the cut-out image is made at the filter processing unit 324. The parameter is determined based upon the value so that the image has the average brightness and the frequency characteristics suitable for detection of the later encoded image pattern. The ideal average brightness is the same as a value of 50% (if the image has 8 bits, the average brightness is 127 or 128). The ideal frequency characteristic is a characteristic in which there are many frequency components corresponding to the corresponding encoded image pattern and there are a few frequency components of the other encoded image pattern. At step S1003 an entire surface of the image is defined as an object to be cut out, and a huge number of calculation costs are required for analysis of the image characteristics. However, since at step S1009 the cut-out image is a part of the image, the calculation cost at step S1009 is lower than the calculation cost at step S1003.

A method of determining parameters of the linearity adjusting processing is the same as the determining method at step S1003.

A determining method of parameters in the specific processing will be described. In the encoded image pattern such as the two-dimensional code, a ratio of black cell areas and white cell areas is usually close to 1 to 1. When the processing where the cut-out image is analyzed by using this nature and the ratio of the black cell areas and the white cell areas is close to 1 to 1 is executed at the special processing unit 326, an image more suitable for the decoding of the encoded image pattern is obtained. For example, a pixel number in an area where density is thicker than a first threshold value and a pixel number in an area where density is thinner than a second threshold value are calculated, and parameters of the fatting processing and the thinning processing are determined based upon the ratio.

Figure 15:
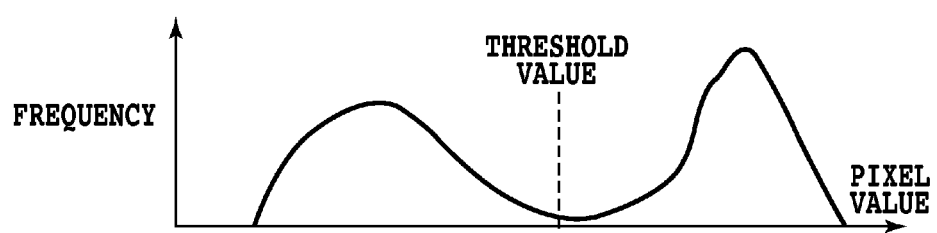
FIG. 15 is a diagram showing a histogram of a two-dimensional code.

The threshold value parameter of the binarization processing at step S1010 is determined by analyzing the cut-out image. Analysis of the cut-out image is made at the multivalue binary unit 321. As the analysis method, there is considered a method of using histogram of the cut-out image. For example, the histogram of the cut-out image as shown in FIG. 15 is taken to determine the threshold value parameter so that separability of two clusters (cluster classified into a white pixel and cluster classified into a black pixel) is maximized. As the evaluation method of the separability of the cluster, there is considered a method of using covariance matrixes of the clusters with each other. Further, the threshold value parameter may be determined so that a ratio of the number of pixels classified into the white pixel and the number of pixels classified into the black pixel is 1 to 1. It should be noted that if the correction processing is normally executed, a value of 50% (if the image is made of 8 bits, it is 127 or 128) may be the threshold value parameter.

Next, at step S1009 the CPU 301 executes the correction processing based upon the correction processing parameter determined at step S1008. That is, the CPU 301 determines a correction quantity for executing the correction processing based upon the correction processing parameter determined at step S1008.

The variable magnification unit 323 executes the variable magnification processing based upon the variable magnification processing parameter determined at step S1008. The filter processing unit 324 executes the filter processing based upon the variable magnification processing parameter determined at step S1008. The linearity adjusting unit 325 executes the linearity adjusting processing based upon the linearity adjusting processing parameter determined at step S1008. The special processing unit 326 executes the specific processing based upon the parameters for the fatting processing and thinning processing determined at step S1008.

The image as a correction processing object may be an image cut out from an entire surface of the scanned image, and as compared to a case of correcting the entire surface of the image, the calculation cost of the correction processing is low. Therefore, it is preferable to execute all the correction processing, but a part of the correction processing may be executed.

Next, at step S1010 the CPU 301 executes binarization processing to the image corrected at step S1009, at the multivalue binary unit 321 based upon the threshold value parameter of the binarization processing determined at step S1008.

Next, at step S1011 the CPU 301 performs decoding of the encoded image pattern at the encoded image pattern decoding unit 329 from the image binarized at step S1010.

Figure 12:
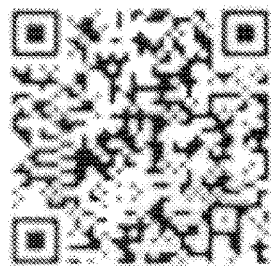
FIG. 12 is a diagram showing a two-dimensional code after scan image processing.

When the encoded image pattern to which the scan image processing is executed at step S1002 is as shown in FIG. 12, the encoded image pattern binarized at step S1005 becomes as shown in FIG. 13.

Since the encoded image pattern shown in FIG. 13 has the clear detection pattern for the detection processing of the detection pattern at step S1006, it has no problem with the detection. However, since the black cell is excessively thin for the decoding processing of the encoded image pattern at step S1011, there occurs a problem with the decoding. That is, even if the correction processing and the binarization processing executed at step S1004 and at step S1005 are sufficient pre-processing for the processing at step S1006, they are not sufficient pre-processing for the processing at step S1011.

Figure 14:
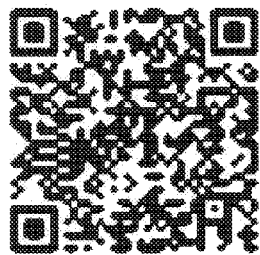
FIG. 14 is a diagram showing a two-dimensional code after pre-processing of decoding processing of an encoded image pattern.

A size of the image to be processed at step S1006 and a size of the image to be processed at step S1011 are largely different from each other. Therefore, even if the pre-processing requiring the large calculation cost is executed for the processing at step S1011, it does not have a large impact on the entire calculation cost. Therefore, at step S1009 and step S1010 the pre-execution for an image which requires more calculation costs as compared to that at step S1004 and step S1005 and is suitable for the decoding processing of the encoded image pattern is executed. By doing so, an image in which a size of the white cell is balanced to a size of the black cell as shown in FIG. 14 can be generated. At step S1011 the decoding processing of the encoded image pattern is executed to the image as shown in FIG. 14. By thus separately executing the image for detecting the detection pattern of the encoded image pattern and the image for decoding the encoded image pattern, the decoding performance of the encoded image pattern can be improved in the form of restricting the calculation cost.

After the decoding processing is completed, the CPU 301 saves the decoding result in the RAM 302 using a data bus (not shown).

Next, at step S1012 the CPU 301 determines whether or not a print of the scan image is made from the decoding result saved in the RAM 302.

In a case where the CPU 301 analyzes the decoding result, information in regard to the print determination is contained among the decoding result and further, the information is defined as copy prohibition (case of prohibition), execution of the print is cancelled. Then the processing ends.

In a case where the information is other than prohibition (permitted), the CPU 301 determines that the execution of the print is permitted, the process goes step S1013. It should be noted that also in a case where the encoded image pattern is not found, the CPU 301 determines that the execution of the print is permitted.

Next, at step S1013 the CPU 301 executes the print image processing following the determination at step S1012.

First, the CPU 301 decompresses the compressed image generated at step S1002 saved in the RAM 302 or in the HDD 304 at the decompression unit 316 to processing it at the print image processing unit 315.

Next, the CPU 301 executes the printer image processing to the decompressed image at the printer image processing unit 315. The printer image processing unit 315 processes the image at a groundwork elimination processing unit 601, a monochrome generating unit 602, a Log converting unit 603, an output color correction unit 604, an output-side gamma correction unit 605, and a halftone correction unit 606. It should be noted that at the time of color printing, the CPU 301 does not operate the monochrome generating unit 602.

The CPU 301 sends out the image in which the printer image processing is executed to the printer IF 315.

Next, at step S1014 the CPU 301 forms the image received through the printer IF 314 on a paper in a printer 14. The paper on which the printing is made is outputted to the output tray (not shown).

Second Embodiment

Next, by referring to the drawing, a second embodiment will be explained. It should be noted that the drawings explained in the first embodiment and the explanation in regard to the flow charts are omitted. Here, the explanation will be made using FIG. 16 as a flow chart to be explained in the second embodiment.

Figure 16:
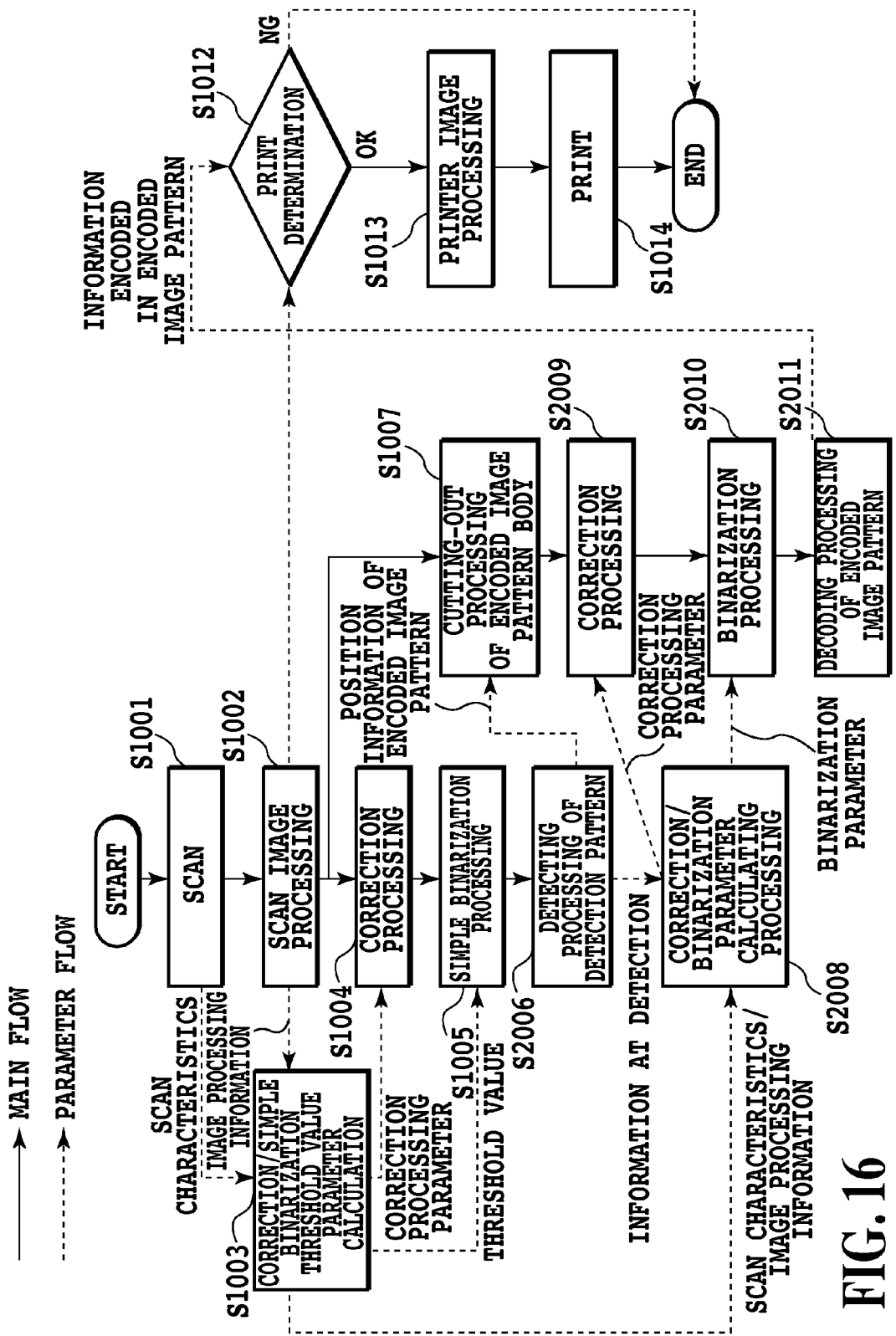
FIG. 16 is a flow chart showing a second embodiment.

The processing of each process in the flow chart in FIG. 16 is collectively controlled by the CPU 301. The flow chart in FIG. 16 is executed when at the operation unit 12 a user selects the processing accompanied by the scan processing and presses a start button.

Step S1001 to step S1005 in FIG. 16 as the flow chart in the second embodiment are the same as step S1001 to step S1005 in the first embodiment.

At step S2006 the CPU 301 performs detection for a detection pattern of the encoded image pattern at the detection pattern detecting unit 328 from the image binarized at step S1005. Since plural detection patterns exist per one information code, a position of the encoded image pattern body can be specified from the position relation. In consequence, in a case where the detection pattern is detected, the CPU 301 executes the following processing. That is, the CPU 301 derives the position information of the encoded image pattern from the detected detection pattern information and saves that position information in the RAM 302.

At detecting, fatting/thinning information of the detected detection pattern can be obtained. The detection pattern of the two-dimensional code has the structure in which a frame of white cells having a width of one cell exists around black cells of 3×3 and a frame of black cells having a width of one cell exists further outside of it. Therefore, any cross section passing through a center of the black cells of 3×3 is ideally configured so that a ratio of black area:white area:black area: white area:black area is a ratio of 1:1:3:1:1. At detecting, the deviation of the ratio from the ideal value can be obtained. The deviation information from the ideal value shows the white cell or the black cell of the two-dimensional code is either fatted or thinned, and this fatting/thinning information is saved in the RAM 302. Since the fatting/thinning has possibly directionality, two kinds of the fatting/thinning information in the longitudinal direction and in the lateral direction may be saved.

Incidentally, in a case where the fatting information is "fat", the thinning processing is supposed to be executed to the encoded image pattern (image obtained by the cutting-out processing at step S1007). On the other hand, in a case where the fatting/thinning information is "thin", the fatting processing is supposed to be executed to the encoded image pattern (image obtained by the cutting-out processing at step S1007).

Step S1007 in FIG. 16 as the flow chart in the second embodiment is the same as step S1007 in the first embodiment.

Next, at step S2008 the CPU 301 calculates parameters of the correction processing used at step S2009 and parameters of the binarization processing used at step S2010. At the time of the calculating, in addition to the information in regard to the parameter at scanning following parameters are used. Namely the parameter at scan image processing saved in the RAM 302 used at step S1003, the fatting/thinning information saved in the RAM 302 or the detection pattern detected at step S2006 is used. By using these pieces of the information in addition to the information used at step S1003, more accurate correction processing and binarization processing are realized.

Next, at step S2009 the CPU 301 executes, as main correction processing, the variable magnification processing by the variable magnification unit 323, the filter processing by the filter processing unit 324, the linearity adjusting processing by the linearity adjusting unit 325, and the fatting processing and noise pixel removal by the special processing unit 326.

A method of determining parameters in the variable magnification processing at step S2009 is the same as the method of determining the parameters at step S1003. However, the variable magnification processing at step S2009 is the variable magnification processing to a partial image. Therefore, the load of the variable magnification processing at step S2009 is lower than the load of the variable magnification processing at step S1004. Accordingly, at step S2009 the variable magnification processing parameter may be determined taking into account that cubic variable magnification where the variable magnification performance is high, but calculation costs are high can be applied.

A method of determining parameters in the filter processing is the same as the method of determining the parameters at step S1003.

A method of determining parameters in the linearity adjusting processing is the same as the method of determining the parameters at step S1003.

A method of determining parameters in the specific processing will be explained. The detection pattern detected at step S2006 is used to calculate parameters for correcting fatting/thinning of the black cell and the white cell. For example, there is assumed that in a cross section passing through a center of the detection pattern, a ratio of black area:white area:black area:white area:black area is a ratio of 1.2:0.8:3.6:0.8:1.2. In this case, if the thinning processing for about 0.83 times the black cell or the fatting processing for about 1.25 times the white cell is executed, a ratio of black area:white area:black area:white area:black area is a ratio of 1:1:3:1:1. The parameters for the fatting/thinning processing for deforming the detection pattern to this ideal ratio are determined. In addition, the special processing unit 326 has a capability of removing the noise pixel and calculates also the removal parameter.

In addition, the following method is provided as a method of determining parameters in the other specific processing. In this case also, the detection pattern detected at step S2006 is used to calculate parameters for correcting fatting/thinning of the black cell and the white cell. It should be noted that as for the detection pattern, in a case where three detection patterns are detected at step S2006, any one thereof is used as an object herein.

Figure 17:
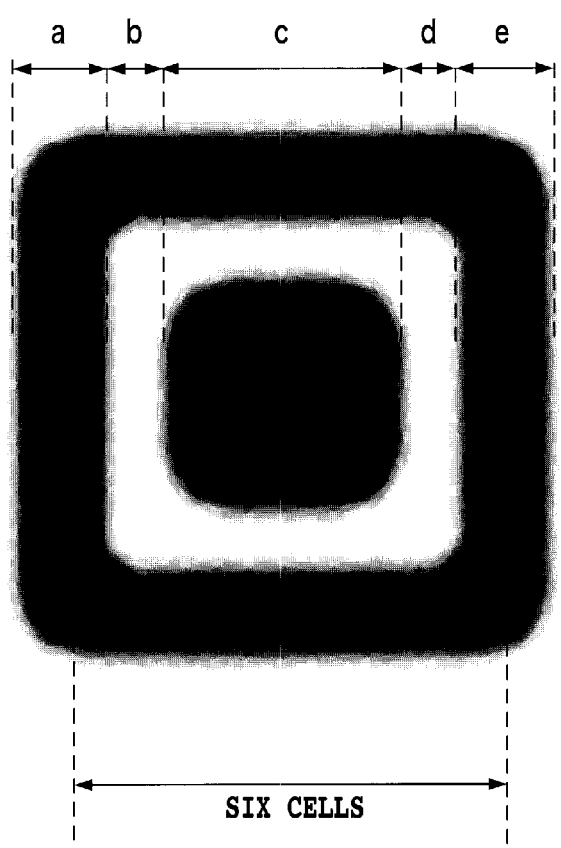
FIG. 17 is a diagram showing an example of a detection pattern.

For example, there is assumed that the detection pattern is a detection pattern as shown in FIG. 17. There is assumed that in a horizontal cross section passing through a center of the detection pattern, pixel numbers of black area:white area: black area:white area:black area are a pixel:b pixel:c pixel:d pixel:e pixel. Then, the cell number between a center of the right pixel and a center of the left cell is to be six cells as shown in FIG. 17. Accordingly, $(a/2+b+c+d+e/2)/6$ is calculated as the pixel number of one cell, and the pixel number of the one cell is set as w. In this way, the pixel number of the one cell as a reference is found. Then, parameters for fatting/thinning processing for correction so that each black area (a pixel, c/3 pixel, or e pixel) has approximately a width of w pixels are determined (if the black area has approximately a width of w pixels, the white area results in having approximately a width of w pixels).

For finding the pixel number of the one cell as a reference, there is also considered a method of using a distance from the left end of the left black area to the right end of the right black area. In this case, the distance is expected to amount to seven cells, but the distance varies largely in such a manner as to amount to more than or less than seven cells due to the influence of the fatting/thinning of the black pixel. Therefore, for finding the pixel number of the one cell as a reference, the aforementioned method of using the number of the cells between the center of the right black cell and the center of the left black cell, which is hard to be influenced by the fatting/thinning, is preferable.

Followed by it, the parameter determining method will be in more detail explained. Various methods are considered for it, but one example thereof is parameter $xh=(a+c+e-5w)/6$. The expression of the half $(a+c+e-5w)$ thereof shows a calculation on how much the black areas are in sum fatted as the entirety of the black areas (in a case where the expression of $(a+c+e-5w)$ becomes minus, the expression shows calculation on how much the black areas are thinned). Further, by dividing the expression of $(a+c+e-5w)$ by six, it calculates how much each black area is fatted left/right on average. Because there are three black areas totally and the number of locations possible to be fatted are two which are allotted to the right and left sides of each black area, 6 of 3×2 is used as a division value.

For returning the fatting of the parameter xh pixel back to the previous state, the fatting processing of $-xh$ pixel (that is, thinning processing of xh pixel) is necessary. As the fatting/thinning processing using this parameter, the following processing is considered. It should be noted that, in this step, the processing until the finding of the parameter is completed is executed, and the fatting/thinning processing actually using the parameter as follows is executed in the special processing unit 326 as follows.

First, in a case of the fatting processing, there is executed the processing of replacing the density value (value (x, y)) of the pixel-of-interest for the maximum value (processed value (x, y)) among density values of pixels adjacent to the pixel-of-interest including the pixel-of-interest (in a case of the thinning processing, not the maximum value, but the minimum value). This is shown by the calculation formula as follows.

$$\text{Processed value }(x,y) = \text{max value }(\text{value }(x-1,y), \text{value }(x,y), \text{value }(x+1,y))$$

Processed value (x,y): density value of the pixel-of-interest after executing the above replacing processing Value (x,y): density value of the pixel-of-interest before executing the above replacing processing max value (a, b, c): function outputting the maximum value among a, b, c Specially first, the pixel-of-interest is set in the pixel existing in x=1 and y=1 (left top) to execute the replacing processing. After executing the replacing processing, the pixel-of-interest is shifted so that x=2 and y=1. The replacing processing is executed to all the pixels (all the pixels in the image obtained by the cutting-out processing at S1007) while shifting the pixel-of-interest one by one in such a manner as to execute the replacing processing to the pixel-of-interest.

It should be noted that a search range of the vicinity is, as shown in the formula, determined as a range of three pixels in the lateral direction around the pixel-of-interest. That is, the pixel in the vicinity includes three pixels composed of a pixel in the left of the pixel-of-interest, the pixel-of-interest, and a pixel in the right of the pixel-of-interest.

When the above processing is executed once, it results in the fatting/thinning processing of one pixel.

In the present embodiment, such a replacing processing is executed "xh" times ("xh" is an integer number obtained by rounding xh). For executing the N-th (N is equal to or less than "xh" and natural number equal to or more than 2) replacing, processed values (x,y) of all the pixels obtained by executing the (N−1)-th replacing processing are set as values (x,y) and then, the N-th replacing processing is executed. It should be noted that also in the longitudinal direction, calculation of correction parameters is made in the form similar to the lateral direction.

In a case of the longitudinal direction, the vicinity search range of the fatting/thinning processing is three pixels in the longitudinal direction around the pixel-of-interest.

In this way, in regard to two directions of the longitudinal direction and the lateral direction, parameters for the fatting/thinning processing are determined. These parameters are used to sequentially execute the fatting and thinning processing in the longitudinal direction and in the lateral direction (specially, for example, after completing the fatting and thinning processing in the lateral direction, the fatting and thinning processing in the longitudinal direction is executed. That is, after "xh" times of the replacing processing in the lateral direction are completed, "yh" times of the replacing processing in the longitudinal direction are executed. It should be noted that yh is a parameter in the longitudinal direction). For simultaneously executing the fatting processing in the longitudinal and lateral directions at this time, the vicinity search range at the time of the fatting/thinning processing may be pixels of 3×3 around the pixel-of-interest.

The special processing unit 326 has a capability of removing noise pixels and calculates the removal parameter. A cell size of the encoded image pattern corresponding to the decoding can be predicted from the fatting/thinning information and is a cell size of which the w pixel mentioned before is predicted. Based upon this predicted cell size, a size (for example, longitudinal w/2 and lateral v/2) of a separate pixel to be removed as the noise is calculated, which is defined as the removal parameter. For example, in a case where w in the lateral direction is 10 pixels and a cell size v in the longitudinal direction is 12 pixels, a separate pixel group equal to or less than 5 pixels in the lateral direction and 6 pixels in the longitudinal direction, which is sized to be equal to or less than a half, is assumed as a noise pixel. In this way, a noise removing parameter for removing it from the image (pixel obtained by the cutting-out processing at S1007) is determined.

The threshold value parameter of the binarization processing at S2010 may be usually a value of 50% (if the image is 8 bits, it is 127 or 128) if the correction processing is correctly executed. However, for reducing a load of the correction processing, in a case where the correction processing is not sufficiently executed, a deviation from the threshold value of 50% due to non-correction processing is calculated. A value to which the deviation value is reflected is defined as the threshold value (because the filter processing is involved, an accurate deviation value can not be calculated).

Next, at step S2009 the CPU 301 executes the correction processing based upon the correction processing parameter determined at step S2008. That is, the CPU 301 determines a correction quantity for executing the correction processing based upon the correction processing parameter determined at step S2008. The image as a correction processing object is an image cut out from an entire surface of the scanned image The variable magnification unit 323 executes the variable magnification processing based upon the variable magnification processing parameter determined at step S2008. The filter processing unit 324 executes the filter processing based upon the variable magnification processing parameter determined at step S2008. The linearity adjusting unit 325 executes the linearity adjusting processing based upon the linearity adjusting processing parameter determined at step S2008. The special processing unit 326 executes the specific processing (fatting processing and thinning processing) based upon the parameters of the fatting processing and thinning processing determined at step S2008. This processing is as already described above. The special processing unit 326 executes the specific processing (noise removal) based upon the noise removal parameter determined at step S2008.

The image as a correction processing object may be an image cut out from an entire surface of the scanned image, and as compared to a case of correcting the entire surface of the image, the calculation cost of the correction processing is low. Therefore, it is preferable to execute all the correction processing, but a part of the correction processing may be executed.

Next, at step S2010 the CPU 301 executes binarization processing to the image corrected at step S2009, at the multivalue binary unit 321 based upon the threshold value parameter of the binarization processing determined at step S2008.

Next, at step S2011 the CPU 301 performs decoding of the encoded image pattern at the encoded image pattern decoding unit 329 from the image binarized at step S2010.

When the encoded image pattern to which the scan image processing is executed at step S1002 is as shown in FIG. 12, the encoded image pattern binarized at step S1005 becomes as shown in FIG. 13.

Since the encoded image pattern shown in FIG. 13 has the clear detection pattern for the detection processing of the detection pattern at step S1006, it has no problem with the detection. However, since the black cell is excessively thin for the decoding processing of the encoded image pattern at step S2011, there occurs a problem with the decoding. That is, even if the correction processing and the binarization processing executed at step S1004 and at step S1005 are sufficient pre-processing for the processing at step S1006, they are not sufficient pre-processing for the processing at step S2011.

A size of an image to be processed at step S1006 and a size of an image to be processed at step S2011 are largely different from each other. Therefore, even if the pre-processing requiring the large calculation cost is executed for the processing at step S2011, it does not have a large impact on the entire calculation cost. Therefore, at step S2009 and step S2010 the pre-execution for an image which requires more calculation costs as compared to step S1004 and step S1005 and is suitable for the decoding processing of the encoded image pattern is executed. By doing so, an image in which a size of the white cell is balanced to a size of the black cell as shown in FIG. 14 can be generated. At step S2011 the decoding processing of the encoded image pattern is executed to the image as shown in FIG. 14.

As explained above, according to the above embodiment, the following is possible. That is, by separately executing the image for detecting the detection pattern of the encoded image pattern and the image for decoding the encoded image pattern, the decoding performance of the encoded image pattern can be improved in the form of restricting the calculation cost.

After the decoding processing is completed, the CPU 301 saves the decoding result in the RAM 302 using a data bus (not shown).

Step S1012 to step S1014 in FIG. 16 as the flow chart in the second embodiment are the same as step S1012 to step S1014 in the first embodiment.

Other Embodiments

Aspects of the present invention can also be realized by a computer of a system or apparatus (or apparatuses such as a CPU or MPU) that reads out and executes a program recorded on a memory apparatus to perform the functions of the above-described embodiment(s), and by a method, the steps of which are performed by a computer of a system or apparatus by, for example, reading out and executing a program recorded on a memory apparatus to perform the functions of the above-described embodiment(s). For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-028585, filed Feb. 10, 2009, and 2009-281957, filed Dec. 11, 2009 which are hereby incorporated by reference herein in their entirety.

What is claimed is:

1. An apparatus for decoding a two-dimensional code having a detection pattern, comprising:
    a detecting unit configured to binarize a multivalue image with a first binarization threshold value to detect the detection pattern;
    a correcting unit configured to correct a density of the two-dimensional code in the multivalue image at a position specified by the detected detection pattern, correction being based upon a density of the detection pattern, so as to obtain a corrected multivalue two-dimensional code; and
    a decoding unit configured to binarize, with a second binarization threshold value calculated using the multivalue image, the corrected multivalue two-dimensional code of which the density has been corrected by the correcting unit, so as to obtain a binarized and corrected two-dimensional code, and to decode the binarized and corrected two-dimensional code,
    wherein the first and second binarization threshold values are different from each other.

2. An apparatus according to claim 1, wherein the correcting unit calculates a ratio of black and white in the detected detection pattern to correct the multivalue image at the specified position, based on the calculated ratio.

3. A method for decoding a two-dimensional code having a detection pattern, comprising:
    a detecting step of binarizing a multivalue image with a first binarization threshold value to detect the detection pattern;
    a correcting step of correcting a density of the two-dimensional code in the multivalue image at a position specified by the detected detection pattern, correction being based upon a density of the detection pattern, so as to obtain a corrected multivalue two-dimensional code; and
    a decoding step of binarizing, with a second binarization threshold value calculated using the multivalue image, the corrected multivalue two-dimensional code of which the density has been corrected in the correcting step, so as to obtain a binarized and corrected two-dimensional code, and to decode the binarized and corrected two-dimensional code,
    wherein the first and second binarization threshold values are different from each other.

4. A method according to claim 3, wherein the correcting step calculates a ratio of black and white in the detected detection pattern to correct the multivalue image at the specified position, based on the calculated ratio.

5. A non-transitory computer readable storage medium on which is stored a program for implementing a method by a computer, the method for decoding a two-dimensional code having a detection pattern, comprising:
    a detecting step of binarizing a multivalue image with a first binarization threshold value to detect the detection pattern;
    a correcting step of correcting a density of the two-dimensional code in the multivalue image at a position specified by the detected detection pattern, correction being based upon a density of the detection pattern, so as to obtain a corrected multivalue two-dimensional code; and
    a decoding step of binarizing, with a second binarization threshold value calculated using the multivalue image, the corrected multivalue two-dimensional code of which the density has been corrected in the correcting step, so as to obtain a binarized and corrected two-dimensional code, and to decode the binarized and corrected two-dimensional code,
    wherein the first and second binarization threshold values are different from each other.

* * * * *